US012236655B2

(12) United States Patent
van Schriek et al.

(10) Patent No.: US 12,236,655 B2
(45) Date of Patent: Feb. 25, 2025

(54) EFFICIENT PLANT SELECTION

(71) Applicant: Keygene N.V., Wageningen (NL)

(72) Inventors: Marco Gerardus Maria van Schriek, Wageningen (NL); Rudolf Laurentius van Bavel, Wageningen (NL); Niek Bouman, Wageningen (NL)

(73) Assignee: Keygene N.V., Wageningen (NL)

( * ) Notice: Subject to any disclaimer, the term of this patent is extended or adjusted under 35 U.S.C. 154(b) by 359 days.

(21) Appl. No.: 17/771,116

(22) PCT Filed: Oct. 29, 2020

(86) PCT No.: PCT/EP2020/080422
§ 371 (c)(1),
(2) Date: Apr. 22, 2022

(87) PCT Pub. No.: WO2021/084019
PCT Pub. Date: May 6, 2021

(65) Prior Publication Data
US 2022/0383051 A1 Dec. 1, 2022

(30) Foreign Application Priority Data
Oct. 31, 2019 (EP) .................................... 19206566

(51) Int. Cl.
*G06V 10/00* (2022.01)
*B07C 5/342* (2006.01)
(Continued)

(52) U.S. Cl.
CPC ............ *G06V 10/235* (2022.01); *B07C 5/342* (2013.01); *G02B 27/0179* (2013.01); *G06F 18/217* (2023.01)

(58) Field of Classification Search
CPC .... G06K 9/2054; G06K 9/6262; G06K 9/629; G06K 9/46; G06F 8/42; G06V 10/235; G02B 27/0179; B07C 5/342
See application file for complete search history.

(56) References Cited

U.S. PATENT DOCUMENTS

2006/0224327 A1* 10/2006 Dunlap .................. G06Q 30/02
702/19
2014/0184585 A1* 7/2014 Unger ..................... G06T 19/20
345/419
2015/0325038 A1 11/2015 Baker

FOREIGN PATENT DOCUMENTS

WO 2017/223011 A1 12/2017
WO 2019/106639 A1 6/2019

OTHER PUBLICATIONS

Sigrimis, "New Ways on Supervisory Control of a Virtual Greenhouse to Train and to Manage", IFAC Bio-Robotics, Information Technology and Intelligent Control for Bio-Production Systems, Sakai, Osaka, Japan, 2000.

(Continued)

*Primary Examiner* — Phuoc H Doan
(74) *Attorney, Agent, or Firm* — N.V. Nederlandsch Octrooibureau

(57) ABSTRACT

A plant selection apparatus has a storage means for storing a plurality of image datasets of plants and associated plant information including at least one of genotype information of the plants, phenotype information of the plants, and pedigree information of the plants. A selection unit preselects a subset of the plants. A display device displays the image datasets of the subset of the plants. A tracking unit generates observation information including information on which of the subset of the plants is observed, and the storage means is configured for storing the observation information. A training unit trains a classifier based on the observation (Continued)

information, the input selection, and the plant information including said at least one of the genotype information, the phenotype information, and the pedigree information.

19 Claims, 7 Drawing Sheets

(51) Int. Cl.
  *G02B 27/01*   (2006.01)
  *G06F 18/21*   (2023.01)
  *G06V 10/22*   (2022.01)

(56) References Cited

OTHER PUBLICATIONS

Pound et al., "Automated Recovery of Three-Dimensional Models of Plant Shoots from Multiple Color Images", Plant Physiology®, Dec. 2014, vol. 166, pp. 1688-1698, www.plantphysiol.org ©, 2014 American Society of Plant Biologists.

Li et al., "Digitization and Visualization of Greenhouse Tomato Plants in Indoor Environments", Sensors 2015,15, p. 4019-4051; doi:10.3390/s150204019, ISSN 1424-8220, www.mdpi.com/journal/sensors.

* cited by examiner

Fig. 1
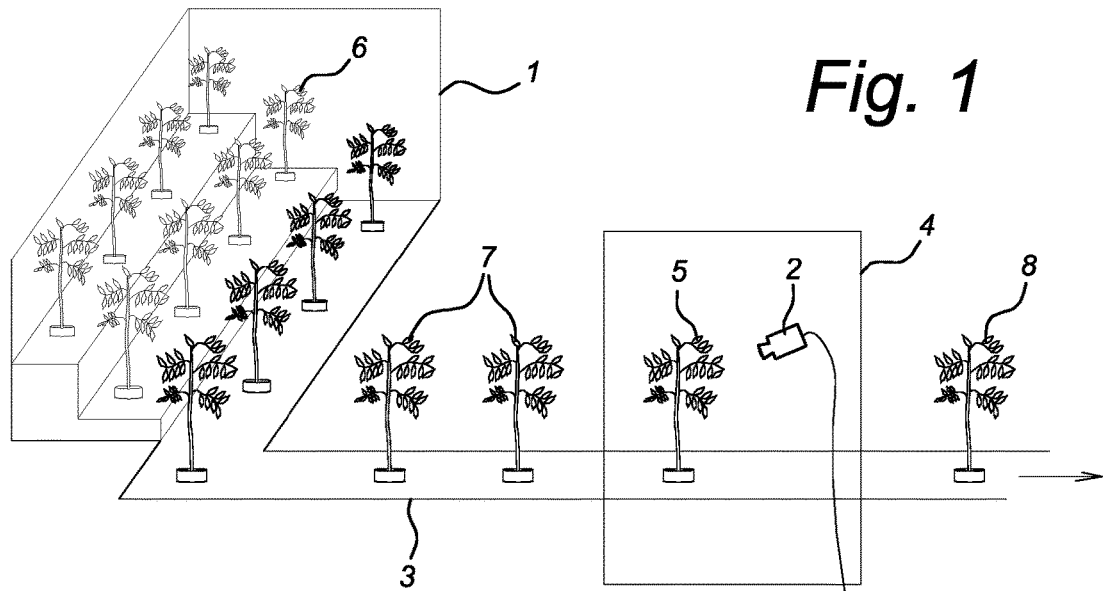
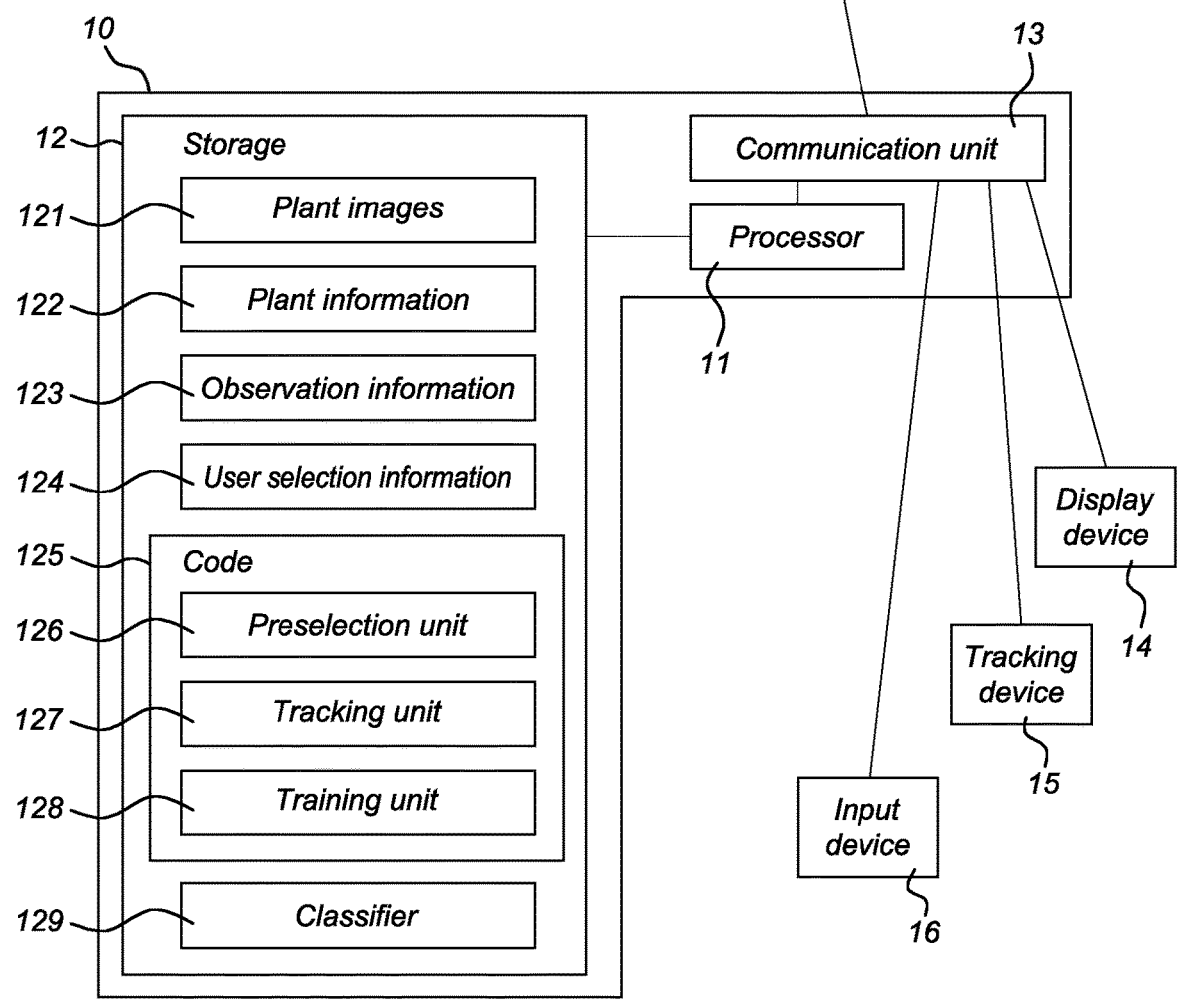

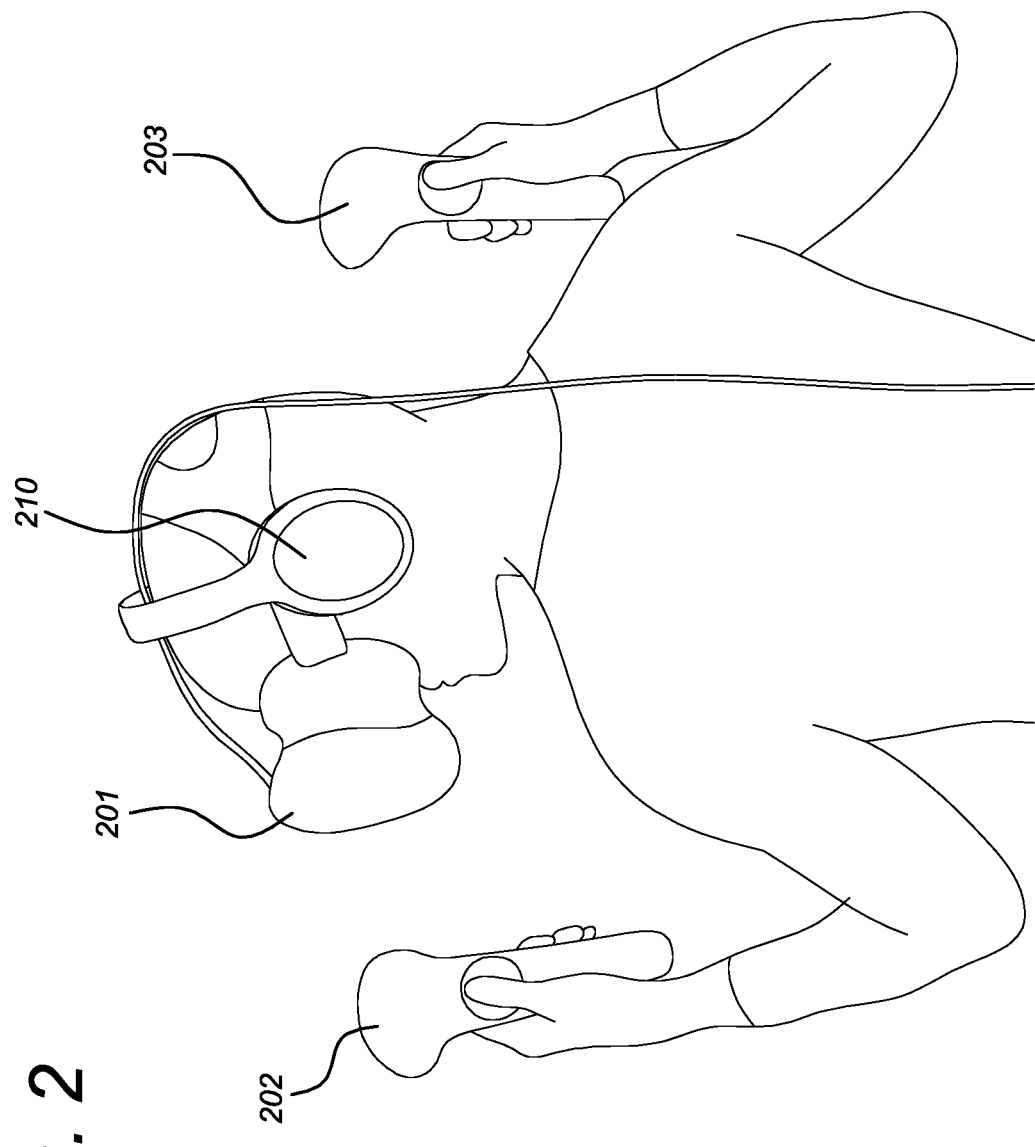

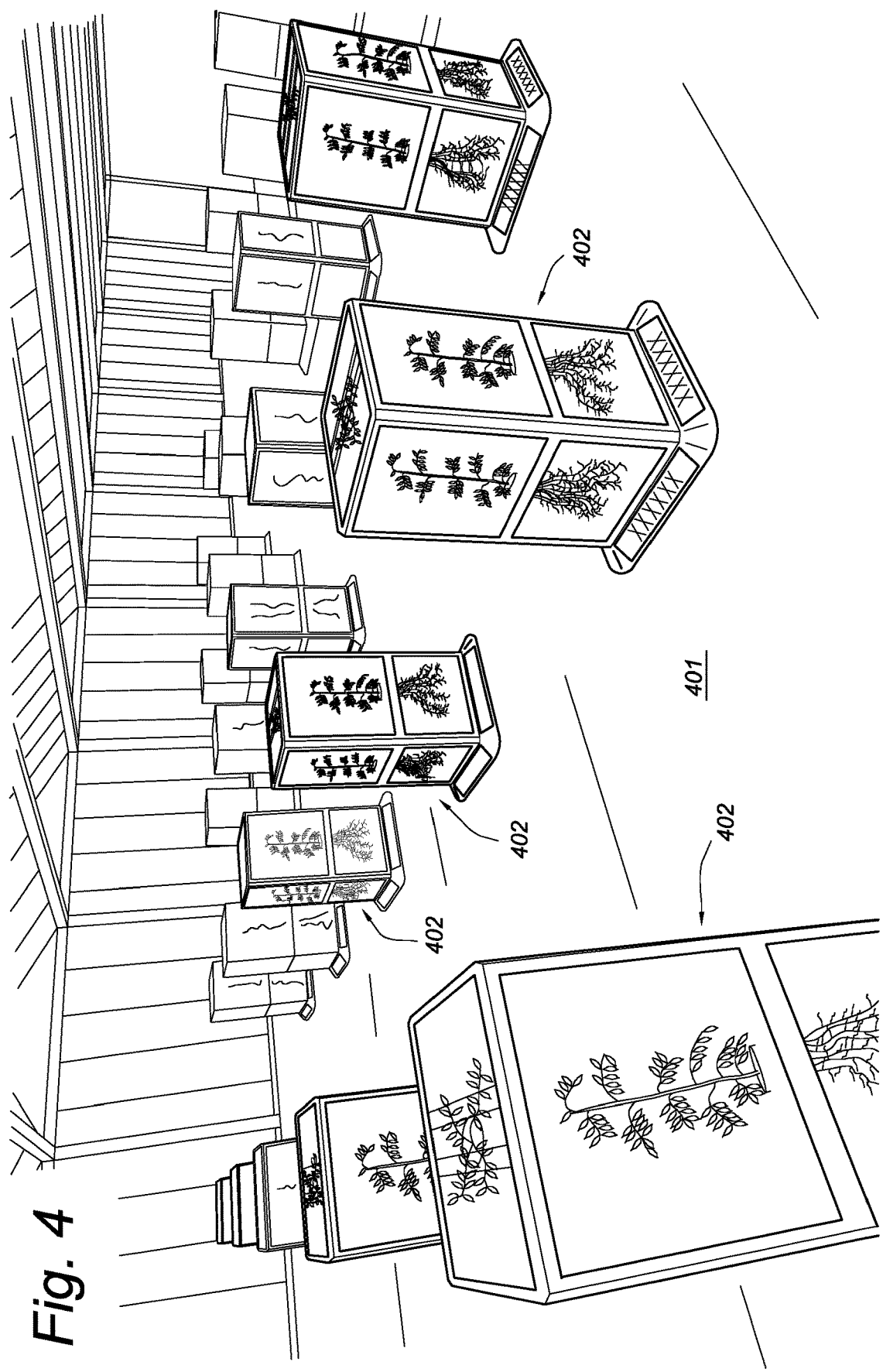

EFFICIENT PLANT SELECTION

FIELD OF THE INVENTION

The invention relates to a plant selection apparatus. The invention further relates to a plant selection method.

BACKGROUND OF THE INVENTION

With the aim of plant breeding, the selection of plants based on plant characteristics is a very challenging and time-consuming task. For example, digitization and visualization of greenhouse tomato plants in indoor environments is known from Dawei Li et al., "Digitization and visualization of greenhouse tomato plants in indoor environments", Sensors 2015, 15, 4019-4051.

A system for monitoring plants is known from WO 2018/130606. That system comprises an input unit, an output unit, and a processor that provides image data for a plurality of plants, each image data being associated with an individual plant. It associates the image data of each plant with corresponding plant characteristic data. It selects a subset of the plants based on the plant characteristic data. Computer graphics objects are understood herein as, for example, photos, point clouds, and object files. It generates a plurality of computer graphics objects corresponding to the selected plants. It applies the image data of each selected plant in form of a computer graphics texture to the corresponding computer graphics object. It determines a position of each computer graphics object in a three-dimensional space of a computer graphics scene. It creates a computer graphics rendering of the scene. It displays the computer graphics rendering.

The ability to visualize large numbers of plants using such a system greatly facilitates the evaluation and selection of plants, as compared to direct inspection of the actual plants. However, it would be advantageous if the system could be further improved.

SUMMARY OF THE INVENTION

It is an aim of the invention to provide an aid for plant selection. In order to better address this concern, an apparatus for training a classifier to classify plants is provided, comprising
- a storage means for storing a plurality of image datasets representing a plurality of plants, and associated plant information including at least one of genotype information of the plurality of plants, phenotype information of the plurality of plants, and pedigree information of the plurality of plants;
- a preselection unit for preselecting a subset of one or more plants of the plurality of plants;
- a display device for displaying the preselected subset of plants using the image datasets;
- a tracking unit for generating observation information comprising information on which of the preselected subset of plants is observed by a user, wherein the storage means is configured for storing the observation information;
- an input device for receiving an input indicative of the user selection of at least one plant among the preselected subset of plants, wherein the storage means is configured for storing information relating to the user selection of the at least one plant;
- a classifier for classifying plants; and
- a training unit for training the classifier based on the observation information, the information relating to the user selection, and the plant information including said at least one of the genotype information, the phenotype information, and the pedigree information.

By tracking which plants are being observed by a user and which plants are subsequently selected by the user, the training unit can train the classifier to make a classification of plants to predict such selections. Specifically, the classification output by a trained classifier can be used for making a preselection of plants that are relevant for the selection process. This way, the manual selection of plants can focus on the preselected plants. This way, the plant selection can be performed much more efficiently, because for example fewer plants need to be manually evaluated. In other words, observations made about earlier plant selections may be used for preselecting the material that has not yet been observed. For example, the training unit may be configured to train the classifier to output a classification indicative of an expected suitability of a plant for further breeding. For example, the classification may comprise a ranking of the plants according to their expected suitability for breeding. Such a ranking may comprise a score or a numerical value. Alternatively, the classification output by the classifier may be, for example, a binary value indicating whether the plant should be part of a preselection of potentially suitable plants. The preselection unit may be configured to make the preselection based on at least one of certain constraints on the plant information and an output of the (partially trained) classifier.

Apart from the information on which of the preselected plurality of plants is observed, the observation information may further comprise information on at least one of: which specific portion of an observed plant is observed; which image dataset of a plant is observed; which portion of which image dataset of a plant is observed; and the amount of time the plant, portion of the plant, image dataset of the plant, or portion of the image dataset of the plant is observed. This information may be used to train the classifier more accurately. By means of the training, the classifier may, for example, relate the portion of the plant that was observed to specific phenotype or genotype information of the plant, and use that related information to classify other plants with similar phenotypes or genotypes.

The specific portion that is observed may include at least one of a root, a stem, a leaf, a flower, and a fruit. For example, it may be detected which of a root, a stem, a leaf, a flower or a fruit is observed most or for the longest time, and this information may be an input to the classifier. Alternatively, the specific root, stem, leaf, flower or fruit that is observed may be detected and used as an input. For example, the lowest root/stem/leaf/flower/fruit may be distinguished from the highest root/stem/leaf/flower/fruit of the plant.

The tracking unit may be communicatively connected to a tracking device, such as an eye tracker or a movement sensor or location sensor of a head-mountable device for being mounted on a head of an observer. The tracking unit may be configured to generate the observation information based on a signal from the tracking device. This allows to detect the observed (portion of a) plant accurately and efficiently.

The display device may comprise a virtual reality (VR) or augmented reality (AR) system configured to show the image datasets of the selected plurality of the plants in a three-dimensional scene. This allows the image datasets of the selected plants to be presented to a user while making it look more like having the actual plants in front of the user. Moreover, the VR or AR system may comprise a tracking device that can be communicatively connected to the tracking unit for generating the observation information.

The preselection unit may be configured to preselect the plurality of plants in dependence on a classification of the plants generated by the classifier. This allows to improve the classifier while using the classifier. After an initial training, the classifier may be used to preselect the plurality of the plants. However, the observation information and selection information collected while visualizing these plants may be used to further improve the classifier by training the classifier based on this additional information.

According to another aspect of the invention, an apparatus for use in plant selection comprises
- a storage means for storing a plurality of image datasets representing a plurality of first plants, and associated plant information including at least one of genotype information of the plurality of first plants, phenotype information of the plurality of first plants, and pedigree information of the plurality of first plants;
- a classifier for classifying the first plants based on the associated plant information, wherein the classifier is trained based on a dataset relating to a plurality of second plants different from the plurality of first plants, the dataset comprising observation information relating to observation of the second plants by a user, user selection information relating to a user selection among the second plants input by the user, and plant information including at least one of genotype information of the second plants in the dataset, phenotype information of the second plants in the dataset, and pedigree information of the second plants in the dataset;
- a preselection unit for preselecting a subset of one or more plants of the plurality of first plants based on a classification of the first plants generated by the classifier; and
- a display device for displaying the preselected subset of first plants using the image datasets.

The plant selection process is made more efficient, because the number of plants to evaluate in order to make a selection of plants is reduced. Indeed, the preselection unit can make a preselection by preselecting the subset of first plants, based on the (automatic) classification performed by the classifier. This way, plants that are unlikely to be suitable candidates for the envisaged purpose do not have to be evaluated manually.

The apparatus for use in plant selection may further comprise a tracking unit for generating observation information comprising information on which of the preselected subset of plants is observed by a user, wherein the storage means is configured for storing the observation information, and an input device for receiving an input indicative of a user selection of at least one plant among the preselected subset of first plants, wherein the storage means is configured for storing information relating to the user selection of the at least one plant. The information thus stored may be used to train the classifier further, so that the classifier is able to better identify suitable plants.

Any of the apparatuses described hereinabove may comprise the input device for receiving an input indicative of a user selection of at least one plant among the preselected subset of first plants, and a plant conveyor system for identifying the actual at least one plant corresponding to the user selection and isolating the at least one plant from multiple stored plants by transporting the at least one plant to a designated location. This allows to efficiently make the selected plant(s) physically available.

Any of the apparatuses described hereinabove may further comprise an automated plant imaging apparatus for automatically positioning a plant with respect to an image sensor, for example in front of a camera, and capturing an image dataset of the plant using the image sensor, and then automatically moving the plant to its designated position and automatically positioning a next plant with respect to the image sensor for capturing an image dataset of the next plant using the image sensor, wherein the storage means is configured to store the captured image datasets in association with each corresponding plant. This allows to collect image datasets of the plants efficiently, and may also help to automatically assess other phenotype information of the plants.

Any of the apparatuses described hereinabove may further comprise a phenotype detection unit configured to generate the phenotype information by performing image analysis of at least one image dataset of a plant to detect a phenotype characteristic of the plant based on the image dataset.

According to another aspect of the invention, a method of training a classifier to classify plants comprises
- collecting and storing a plurality of image datasets representing a plurality of plants, and associated plant information including at least one of genotype information of the plurality of plants, phenotype information of the plurality of plants, and pedigree information of the plurality of plants;
- preselecting a subset of one or more plants of the plurality of plants to obtain a preselected subset of plants;
- displaying the preselected subset of plants using the image datasets;
- generating observation information comprising information on which of the preselected subset of plants is observed by a user, and storing the observation information;
- receiving an input indicative of a user selection of at least one plant among the preselected subset of plants, and storing information relating to the user selection of the at least one plant; and
- training a classifier for classifying plants, wherein the training is based on the observation information, the information relating to the user selection, and the plant information including said at least one of the genotype information, the phenotype information, and the pedigree information.

The method allows to train a classifier for preselecting plants.

The method may comprise providing the plants, and the collecting the plurality of image datasets may comprise capturing at least one image dataset of each plant using an image sensor. This allows the training of the classifier, for example based on a germplasm created by the user.

The method may further comprise collecting and storing a further plurality of image datasets representing a plurality of further plants, and associated further plant information including at least one of genotype information of the further plants, phenotype information of the further plants, and pedigree information of the further plants; classifying the further plants based on the associated further plant information, using the trained classifier, to generate a classification of the further plants; preselecting a subset of one or more further plants of the plurality of further plants based on the classification of the further plants generated by the classifier, to obtain a preselected subset of further plants; and displaying the preselected subset of further plants using the image datasets representing the further plants. This allows to make a preselection of plants using the trained classifier, so that only the preselected subset of plants is visualized.

The method may optionally further comprise receiving an input indicative of a user selection of at least one further plant among the preselected subset of further plants, and storing information relating to the user selection of the at least one further plant. This allows optional automatic handling of plants based on the selection, and/or to train the classifier further using the information collected in relation to the further plants.

According to another aspect of the invention, a method of preselecting plants comprises collecting and storing a plurality of image datasets representing a plurality of first plants, and associated plant information including at least one of genotype information of the plurality of firsts plants, phenotype information of the plurality of first plants, and pedigree information of the plurality of first plants;

classifying the first plants based on the associated plant information, using a classifier that is trained based on a dataset relating to a plurality of second plants different from the plurality of first plants, the dataset comprising observation information relating to observation of the plurality of second plants by a user, user selection information relating to a user selection among the plurality of second plants input by the user, and plant information including at least one of genotype information of the plurality of second plants, phenotype information of the plurality of second plants, and pedigree information of the plurality of second plants;

preselecting a subset of one or more first plants of the plurality of first plants based on a classification of the first plants generated by the classifier; and displaying the preselected subset of first plants using the image datasets.

This facilitates the selection of plants, because a suitable subset of the plants is visualized for inspection by the user, who can then focus attention to the preselected subset of plants.

The method may further comprise providing the plurality of first plants and/or selecting, by a user, at least one plant among the preselected subset. This completes the selection process.

The method may further comprise receiving an input indicative of a user selection of at least one plant among the preselected subset of first plants, and storing information relating to the user selection of the at least one plant. This allows to perform certain automated actions based on the user selection, such as transporting the selected at least one plant to a designated location.

Optionally, the method further comprises generating observation information comprising information on which of the preselected subset of first plants is observed by a user, and storing the observation information; and receiving an input indicative of a user selection of at least one first plant among the preselected subset of first plants, and storing information relating to the user selection of the at least one first plant. Subsequently, the classifier for classifying plants may be further trained based on the observation information in respect of the first plants, the information relating to the user selection of the at least one first plant, and the plant information of the at least one first plant. This helps to improve the classifier for use in a subsequent method of selection.

The method may further comprise providing the first plants, and the collecting the plurality of image datasets may comprise capturing at least one image dataset of each first plant using an image sensor. This allows to make a selection among, for example, a germplasm created by the user.

According to another aspect of the invention, a computer program product is provided comprising instructions that, when executed by a processor system, cause the processor system to perform at least one of the methods set forth.

According to another aspect of the invention, a trained classifier is provided for classifying plants to aid a breeder evaluating the plants, the classifier having been trained by the apparatus for training a classifier to classify plants or the method of training a classifier to classify plants set forth herein.

The person skilled in the art will understand that the features described above may be combined in any way deemed useful. Moreover, modifications and variations described in respect of the described apparatuses may likewise be applied to the methods, and modifications and variations described in respect of the methods may likewise be applied to the apparatuses.

BRIEF DESCRIPTION OF THE DRAWINGS

In the following, aspects of the invention will be elucidated by means of examples, with reference to the drawings. The drawings are diagrammatic and may not be drawn to scale.

FIG. 1 shows an illustration of an apparatus for aiding plant selection and/or training a classifier.

FIG. 2 illustrates a virtual reality equipment used to observe a plurality of selected plants.

FIG. 4 shows a plurality of computer graphics objects.

DETAILED DESCRIPTION OF EMBODIMENTS

Figure 3A:
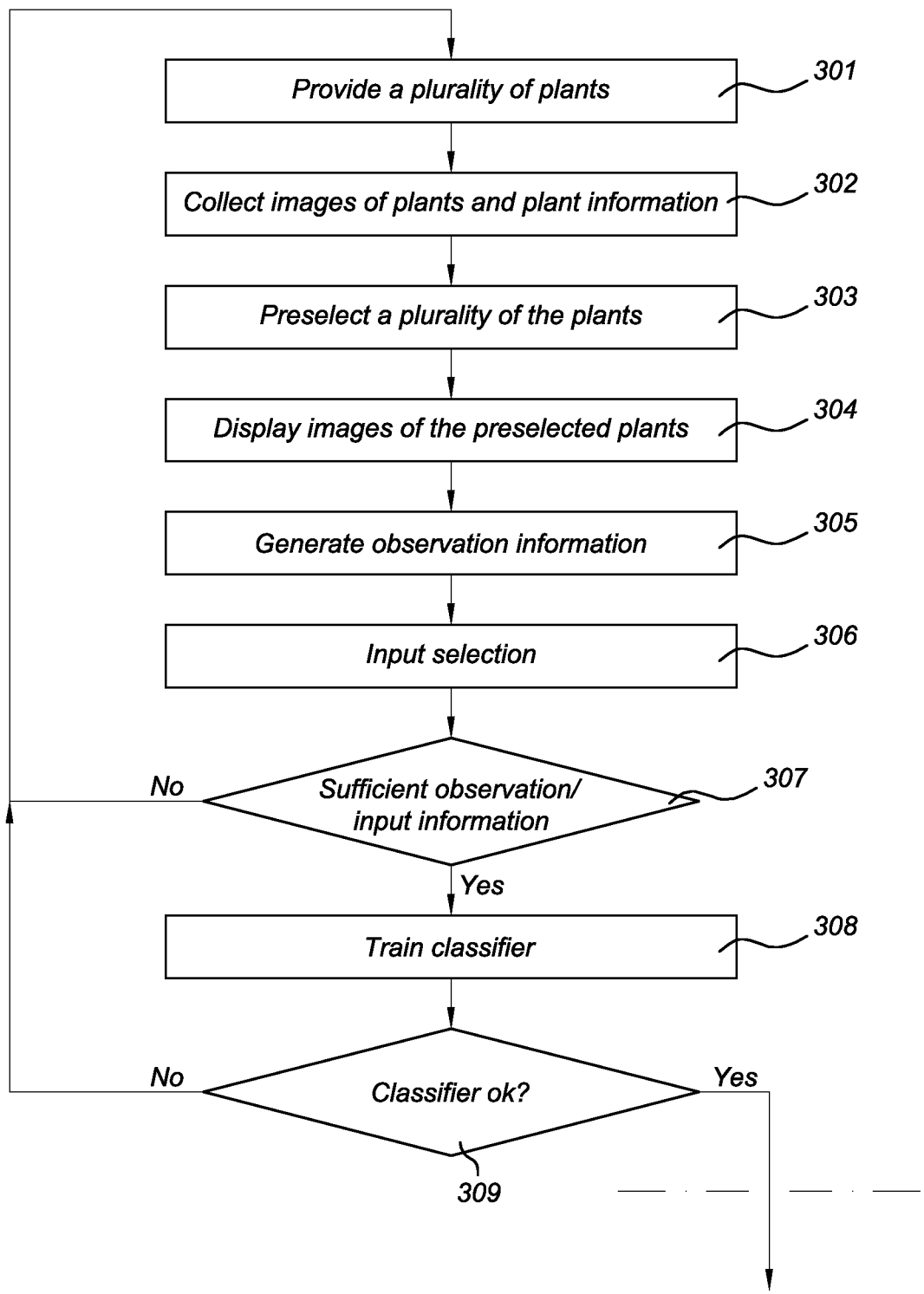
FIG. 3A illustrates a method of training a classifier.

Certain exemplary embodiments will be described in greater detail, with reference to the accompanying drawings.

The matters disclosed in the description, such as detailed construction and elements, are provided to assist in a comprehensive understanding of the exemplary embodiments. Accordingly, it is apparent that the exemplary embodiments can be carried out without those specifically defined matters. also, well-known operations or structures are not described in detail, since they would obscure the description with unnecessary detail. Moreover, it will be apparent to the person skilled in the art that many variations and modifications of the techniques disclosed herein are possible, which are within the spirit and scope of the invention as defined by the claims, and their equivalents.

Plant selections as made by a user may depend upon many factors, which may be difficult to model explicitly. As a result, such selections are complex to automate. The present disclosure describes certain techniques that can be used to actively assist a user when making certain selections. This way, the work of the user may be performed more efficiently.

In certain embodiments, a user may be provided with the opportunity to work in a virtual reality greenhouse. Within the virtual reality greenhouse, the selections a user makes can be monitored in real-time. Those selections in turn can be used for sorting of the material the user has not yet observed. Input for the learning algorithm may include any one or more of 1) image datasets of the plants, 2) the digital phenotypes captured from those image datasets or otherwise detected automatically (or even manually), 3) the time the user spent before making a selection, 4) the exact image datasets the user looks at before or at the time of making a selection, and/or 5) specific image parts, the user was looking at, before or at the time the selection was made. Although the user may be a breeder, the application of the present techniques is not limited thereto. The method and apparatus may be utilized to make plant selections in general. For example, farmers may make selections of plants using the techniques disclosed herein. For example, plants may be selected, using the techniques disclosed herein, for being harvested, recycled, or for receiving a certain treatment. Thus, the techniques disclosed herein may be used to provide an active digital breeder's or farmer's assistant. Thus, the workload of the user will be greatly reduced. Although the initial hurdle to obtain a sufficiently large dataset for training the classifier may be challenging, a stepwise approach may allow the training dataset to be gathered over time.

In certain embodiments, virtual reality may be used for active learning. Moreover, selections a user makes may be real-time monitored. Collected information about those selections in turn can be used for sorting of material the user has not yet observed.

In certain embodiments, inputs for the learning algorithm may include at least one or more of: image datasets of the plants, the digital phenotypes captured from those image datasets, the time the user spent looking at an image to make a selection, the exact image datasets (and even image parts) the user was looking at before the selection was made.

To record the images or image parts the user is looking at, several technical solutions may be employed. In case of a regular computer monitor, the user may be able to select one of the selected image datasets to be displayed in a large size at a time. The enlarged image may be considered to be the image the user is looking at. If the user zooms in the display to a certain part of the plant, this part of the plant in the zoomed-in visualization may be considered to be the part of the plant the user is looking at. More direct manners of tracking what the user is looking at, are also possible. For example, known eye trackers can detect the focal point of what the user is actually looking at or the direction of the user's gaze. By mapping this information to the location of the display and what is being displayed on the display, it becomes possible to detect what portion of a displayed image dataset the user is looking at. Moreover, virtual reality head-mountable devices are known to adapt the images provided to the eyes of the user in dependence of the movements of the head, to simulate a natural movement through a space. Such a system also knows what the user is looking at, because the system controls the display devices within the head-mountable device that output the images that are in the user's field of view. In addition it would be possible to add eye trackers to detect in even greater detail the portion of the image that the user is looking at.

In certain embodiments, further inputs to the learning algorithm may include at least one or more of: DNA, RNA, cDNA, small RNA, etc. etc. of the plants. In general any chromosomic information or genetic data of the plants may be used.

In addition, or alternatively, pedigree information may be used as input to the learning algorithm. Pedigree information may include, but is not limited to, information of the family tree of the plant. For example, genotype data or phenotype data of one or more family members of the plant may be included in the pedigree information. Also scores of family members of this plant or genotype may be incorporated. Also, scores of plants of the family or genotype in different locations or environmental circumstances than the current plant may be used as inputs.

In certain embodiments, further input to the learning algorithm may include phenotype information; for example a digital phenotype of the plant. Such digital phenotype may include, but is not limited to, detectable properties of the plant, such as color, structure, architecture, growth speed, lesions, strength, size, fruit flavor, etc. Phenotypic information may also be information on metabolites and/or proteins present in the plant, e.g. transcriptomic, metabolomic and/or proteomic information of the plants. "Plant" refers herein to the whole plant, a part of a plant and/or a plant product, such as, but not limited to, leaf, fruit, flower, trunk, root, and seed.

In certain embodiments, the observation information may comprise a heat map. The heat map may be indicative of the amount of time spent looking at certain portions of a plant or at a certain image dataset showing the plant. For example, the observation information or heat map may comprise an annotation to an image dataset showing a plant, wherein the annotation indicates for each portion of the plant image dataset, the amount of time the user has looked at that portion of the plant image dataset. For example, when the plant image dataset is composed of a plurality of pixels or voxels, the annotation can indicate for each pixel or voxel, the amount of time that the pixel or voxel has been observed. When the plant image dataset is composed of a point cloud, the annotation can indicate for each point of the point cloud, the amount of time that the point has been observed. Also, in any case, the observation information can be indicative of the chronological order in which the portions are observed, for example by adding a time stamp to each observation. It will be understood that a heat map is only one example implementation of how to represent the observation information. Alternative representations are possible. For example, instead of a heat map, the observation information may comprise a list of observations made by a user. Each observation can include an indication of what was observed, when, and/or for how long. For example, the observation may include a reference to a certain image dataset and optionally an indication of a portion within the image dataset, such as a set of pixels, voxels, or points that the user observed.

The tracking unit 127 may be configured to detect the portion of the plant or plant image dataset that is being observed, using for example a tracking device 15, and then generate the observation information 123 as described herein, based on the detected portion.

The techniques disclosed herein make it possible to learn from the user while the user is working on the plants. As a result an active digital assistant can be trained using the collected data. Eventually, this may reduce the user's workload.

The user may, for example, select the plants based on certain selection criteria. Such criteria may include, but are not limited to, any phenotype information. For example, a user may use selection criteria regarding detectable properties of the plant, such as color, structure, architecture, growth speed, lesions, strength, size, fruit flavor, etc. "Plant" refers herein to the whole plant, a part of a plant and/or a plant product, such as, but not limited to, leaf, fruit, flower, trunk, root, and seed.

FIG. 1 shows an illustration of an apparatus that can provide an aid for selecting plants. For purpose of illustration, the figure shows a greenhouse 1 in which a plurality of plants 6 can be grown. Moreover, the figure shows an installation for capturing images of the plants. That installation comprises a conveyor belt 3 on which plants 7 from the greenhouse may be placed automatically by a robot (not illustrated). The plants may be brought into a chamber 4 with controlled lighting. One plant 5 may be brought into the chamber 4 by means of the conveyor belt, and photographed by a camera 2. After that, the plant may be moved out of the chamber 4 back to the greenhouse 1 by means of the conveyor belt 3, as illustrated by plant 8 which has been photographed before. It will be understood that this is a highly simplified representation of an installation for collecting image datasets of plants. Moreover, more than one image dataset may be captured of each plant, using different cameras from different directions and/or different cameras that are sensitive to different wavelength ranges, such as visible light, infrared, near infrared, ultraviolet, and so forth. Also, the same plant can be imaged multiple times during its lifespan.

The image datasets captured by e.g. the camera 2 may be transmitted to and received by a communication unit 13 of a plant selection apparatus 10. The plant selection apparatus 10 may further comprise a processor 11 and a storage 12, e.g. a memory. The communication unit 13 may, for example, comprise a wired or wireless network connection and/or a universal serial bus (USB), by means of which the communication unit 13 may communicate with peripheral devices such as the camera 2, a display device 14, a tracking device 15, and an input device 16. The processor may be operable to execute computer code 125 stored in the storage 12. The storage 12 may be configured to further store, under control of the processor 11, inter alia plant image datasets 121, plant information 122, observation information 123, user selection information 124, and a classifier 129. The code 125 may comprise, inter alia, a preselection unit 126, a tracking unit 127, and a training unit 128. Other implementations of these units are also possible, for example using dedicated electronic circuitry.

The image datasets captured by e.g. the camera 2 may be transmitted to and received by the communication unit 13 of the plant selection apparatus 10. These plant image datasets 121 may be stored in the storage 12 under control of the processor 11. Moreover, metadata may be stored relating to the plant image datasets, including a date and/or time that the plant image dataset was captured, and information about the plant itself, such as information about its genotype and/or phenotype, as well as its pedigree. For each plant 6, a record containing plant information 122 may be stored in the storage 12. Each plant image dataset may be associated with the plant information of the corresponding plant 6.

The preselection unit 126 may be configured to preselect a plurality of the plants 6. The preselection may be performed automatically, for example based on different criteria, such as, but not limited to, specific phenotype or genotype constraints. For example, the plant preselection apparatus 10 may be configured for a specific breeding goal, and certain minimal constraints may be set, such as absence of certain genetic diseases or absence of certain unwanted phenotype characteristics.

Optionally, the preselection unit 126 may be configured to preselect the plurality of plants based on the classifier 129. The classifier 129 may be partially or entirely stored in form of software and/or parameter values, in the storage 12 or on a remote server. Alternatively, the classifier 129 may be implemented using dedicated electronic circuitry. The classifier 129 may be based on a form of artificial intelligence.

The classifier 129 may, for example, comprise an artificial neural network, for example a convolutional neural network. Alternatively, the classifier 129 may comprise, for example, a statistical model. The classifier 129 may be configured to receive information relating to the plants, such as the plant image datasets 121, plant information 122, and/or the observation information 123 (insofar available), and classify the plants. The preselection unit 126 may be configured to perform the preselection based on the classification output by the classifier 129. For example, the classifier 129 may be configured to output classifications such as "relevant for selection", "not relevant for selection". Alternatively, the classifier 129 may be configured to output a score (for example, a numeric value associated with a plant) as the classification, for example a score representative of the likelihood that a plant may be a suitable candidate for further breeding.

The plant selection apparatus 10 may further comprise a display device 14 for displaying the image datasets of the plurality of the plants 6, as preselected by the preselection unit 126. For example, the plant selection apparatus 10 may be configured to display a particular image dataset of each selected plant, or the latest set of image datasets of each preselected plant. In certain embodiments, the display device 14 may be configured to display a three-dimensional reconstruction of each preselected plant, which may be composed by combining a plurality of the captured image datasets. For example, the plant selection apparatus 10 may be configured to render a three-dimensional graphical scene comprising a plurality of the preselected image datasets, or all of the preselected image datasets, at the same time. The plant selection apparatus 10 may generate three-dimensional graphical objects, wherein each graphical object shows the same plant from several different sides. A plurality of these graphical objects may be visualized in a three-dimensional scene resembling a greenhouse. Alternatively, each plant may be represented by a point cloud or a vector graphics object, which may be visualized using known techniques. These visualizations may allow a user to evaluate the plants in a familiar context. The display device 14 may be a component of a virtual reality head-mountable device or augmented reality head-mountable device, for example. Alternatively, the display device 14 may comprise a three-dimensional display screen which may be viewed by a user equipped with shutter glasses or polarized glasses. Alternatively, the display device 14 may comprise a two-dimensional display (monitor, television), and any three-dimensional effect may be suggested by use of perspective rendering.

The plant selection apparatus 10 may be configured to, based on a user input received through the input device 16, allow to browse through the plurality of selected plants, by sequentially displaying different subsets of the preselected plants, or for example in a VR environment, by detected movements of the head of a user by a head-mountable device having e.g. an accelerometer, to allow the user to virtually move around through the scene filed with the preselected plants.

The tracking unit 127 may be configured to generate observation information 123. This observation information 123 may comprise any information of which plant, or which portion of a plant, or which image dataset of a plant, is displayed and/or is looked at. Different ways of collecting such information are envisaged, for example by generating logs of what is displayed by the display device 14. Alternatively, the direction of viewing of a user may be tracked relative to the displayed plants, using a tracking device 15.

This way, by detecting an intersection of a direction of viewing and a displayed plant, the plant that is being inspected may be determined. It is even possible to detect what portion of a plant is being inspected, and for how long. All this information may be stored in the storage 12 as observation information 123.

The tracking device 15 may comprise an eye tracker to track a gaze direction of an observer. This technology may be used to detect the viewing direction with respect to a displayed plant image dataset, to track what plant is observed, and in particular what part of the plant. Eye trackers are known in the art per se, such as optical tracking. In video-based eye tracking, a camera focuses on one or both eyes and records eye movement as the viewer looks at an image of a plant. For example, the eye-tracker uses the center of the pupil and infrared/near-infrared non-collimated light to create corneal reflections. The vector between the pupil center and the corneal reflections can be used to compute the point of regard on surface or the gaze direction.

Advantageously, the display device 14 and the tracking device 15 may be combined in a head-mountable device 201. The display device 14 may comprise two small displays with corresponding eyepieces to project the displayed image on the user's retinas. The tracking device 15 included in head-mountable device 201 may comprise a movement sensor, for example an accelerometer. The tracking device 15 of the head-mountable device 201 may further comprise a location sensor, for example a GPS or a location sensor of an indoor navigation system. The tracking device 15 of the head-mountable device 201 may further comprise a compass, for example. The tracking device 15 of the head-mountable device 201 may be equipped with additional or alternative sensors to detect a user's field of view. The tracking unit 127 may be configured to generate information about a field of view of the observer based on a signal from any one, or a combination, of these or similar sensors. This information of the field of view of the observer may be used to generate the observation information 123.

For example, in case the display device 14 includes a viewable screen, the tracking unit 127 may compare the determined field of view with the image displayed on the screen. Where the field of view overlaps the screen, the tracking unit 127 may determine what plant or portion of a plant is displayed in the field of view of the observer. Moreover, the tracking unit 127 may determine what plant or plant portion is in a center of the field of view.

In certain embodiments, the display device comprises a virtual reality (VR) or augmented reality (AR) system configured to show the image datasets of the selected plurality of the plants in a three-dimensional scene. For example, the head-mountable device comprises a display device aligned with one or two viewing holes, so that a stereoscopic image may be projected directly into the observer's eyes. The view may be adapted in response to movements of the observer's head-mountable device or in response to a signal from the eye tracker, for example. This way, not only a realistic VR or AR experience is generated, but it also allows the tracking unit 127 to generate the information of what plant or plant parts are in the field of view and/or in the center of the field of view. This information may be stored as part of the observation information 123.

The input device 16, which is a user input device, may be configured to receive an input indicative of a selection of a particular plant of the plurality of plants. Alternatively, the input device 16 may be configured to receive an input indicative of a selection of a subset of the plurality of plants.

For example, the input device 16 may comprise a button. When the button is pressed, the plant selection apparatus 10 may be configured to detect which plant the user is looking at, and this may be considered the selected plant. Instead of a button, a voice recognition command may be employed. Yet alternatively, the user may be provided with a pointer device to point to the plant to be selected. The information about user selected plants is stored in the memory 12 by the tracking unit 127 as user selection information 124.

The plant image datasets 121, plant information 122, observation information 123, and user selection information 124 are all associated with an actual plant. For example, each plant image dataset represents a (part of) a particular plant, the plant information associated with that plant describes certain characteristics of that plant, the observation information associated with that plant is indicative of observation of at least the image datasets of that plant, and the user selection information associated with that plant is indicative of whether that plant was selected (e.g. for breeding) or was given a particular label by an observer. Thus, these pieces of information are collected in respect of the same physical plant. Moreover, these pieces of information are collected associated with other plants as well, i.e. for a plurality of plants.

The tracking unit 127 may be configured to collect and store the observation information 123 and user selection information 127 over time, as the plant selection apparatus is used to select plants of, for example, different generations of a single breeding program or to select plants of different breeding programs. Information may be tracked for an individual user or for different users. Also, a user identification of the involved user may be stored in association with the observation information 123 and/or selection information 127.

In certain embodiments, the observation information 123 may comprise information about what specific portion of an observed plant is observed, and for how long, and in what order the different portions of the plants are observed, and which portion of a plant is observed at the time a plant is selected (or discarded as a non-selectable plant). Different portions of a plant may relate to, for example, a stem, a leaf, a flower, and a fruit.

In certain embodiments, the observation information 123 may comprise information about what image dataset of a plant is observed. For example, different image datasets may be captured of a plant over time. The observation information may include information on the time an observed image was captured; for example the age of the plant at the time the observed image was captured, or the time of year the observed image was captured. Also, different types of image datasets (e.g., differently processed image datasets or image datasets acquired with different types of image sensors, such as cameras or lidar sensors) may be captured of the same plant, to reveal different phenotype characteristics of the plant. The observation information may include information on what type of image dataset the user observes.

The training unit may be configured to train the classifier 129 using at least some of the collected information. For example, the selection information may be used to generate target output values of the classifier. For example, the target output value of the classifier for a plant may correspond to the selection information of that plant. The selection information may be converted to a score and the score may be used as the target output value of the classifier. For example, the score may be 1 if the user selected the plant for further breeding, 0 if the user did not make any selection associated with the plant, and −1 if the user made a selection indicative of non-suitability of the plant for further breeding. Alternatively, or additionally, the target output values and/or a score may be based on results obtained with descendants of the plant. Such results may include a user selection of the descendant, and/or objective plant information about the descendant.

The training input values for the classifier may depend on the input configuration of the classifier. Typically, training input values corresponding to input values to be available during actual use of the classifier may be generated and used to train the classifier. For example, input values of the classifier may include, but are not limited to, any one, or a combination, of plant image datasets 121, plant information 122, and observation information 123.

In certain embodiments, the observation information may be provided during training as extra input values to the classifier. These extra input values may be called auxiliary inputs. The classifier may use the observation information as an aid to interpret the image datasets and/or plant information better. After training, when applying the classifier to classify new (unobserved) plants, the inputs corresponding to the observation information may be omitted or set to a default value.

In certain embodiments, the training unit 128 may comprise a pre-processing unit to perform a pre-processing operation to the data that is used to train the classifier.

For example, the pre-processing unit may be configured to combine the observation information 123 with the image datasets 121 and/or the plant information 122, to provide more relevant training data for the classifier 129. In the following, a few examples of this are disclosed.

First, the plant image datasets 121 may be modified based on the observation information, to obtain augmented plant image datasets. For example, the plant image datasets 121 may be masked based on the observation information. For example, portions of an image dataset that have not been observed by the user, may be deleted or masked out, for example set to zero.

Second, the portions that were not observed, may be smoothened by applying a smoothening filter (instead of being masked), so that the unobserved portions become less detailed than the observed portions in the augmented plant image datasets.

Third, phenotype information that relates to a specific portion of a plant may be deleted if that portion of the plant was not observed by the user. For example, if the stem has not been observed, information about the length and thickness of the stem may be deleted.

In certain implementations of the above examples, the expressions "not observed" or "unobserved" may be replaced with "not observed for more than a predetermined amount of time", and the expression "observed" may be replaced with "observed for more than a predetermined amount of time".

For example, the classifier 129 may comprise an artificial neural network, such as a convolutional neural network, that is suitable for deep learning.

For example, the training unit 128 may be configured to execute a training algorithm to train the classifier (e.g. neural network), as follows.

First, the input values and (target) output values for the classifier are extracted from the collected information.

Suitable input values associated with a plant can include:
1) image datasets depicting the plant. These image datasets may be provided in their raw form as input values. For example, each pixel can be an input value or each point of a point cloud can be represented by three coordinate values. These image datasets may be processed or normalized if desired and provided with labels or annotations indicative of, for example, the age of the plant or the season at the time the image was captured.
2) plant information, such as certain properties of the phenotype and/or genotype and/or pedigree. These properties may be represented in a standardized form, for example one numeric input value may represent the length of the stem in millimeters, measured at a certain age of the plant. Similarly, other phenotype properties may be encoded in a standardized way.
3) both the image datasets and the plant information may be augmented based on the observation information, for example by deleting portions of plants or plant image datasets that were not observed.
4) the observation information may also be included as auxiliary input to the classifier.
5) the genotype information of the plant; for example (parts of) the genome can be converted into numeric values and be included as input values to the classifier.

Suitable (target) output values of the classifier may include a numeric value that encodes whether the plant should be considered a useful item to be selected. For example, the selection information may be converted into a score and the score may be used as the target output value of the classifier. For example, the score may be 1 if the user selected the plant for further use, 0 if the user did not make any selection associated with the plant, and −1 if the user made a selection indicative of non-suitability of the plant for further use. In an alternative embodiment, the plants for which the user did not make any selection at all are omitted in the training procedure.

The training procedure performed by the training unit 128 may make use of the inputs and target outputs generated as described above. The training unit 128 may provide the generated input values for a plant to the classifier 129, and may retrieve the output value(s) of the classifier 129 in response to the provided input. The training unit 128 then may compare the actual output value(s) to the target output value(s). If there is a difference between the actual output value(s) and the target output value(s), the training unit 128 may modify certain model parameters of the classifier 129, such as coefficients in artificial neurons of an artificial neural network, so that the output of the classifier is changed. Such a training procedure based on input values and target output values is known in the art per se.

This training procedure may be repeated for the other plants for which suitable input values and target output values are available, until the difference between the output values generated by the classifier and the target output values is on average below a certain quality threshold.

In certain embodiments, the training unit 128 may be configured for iterative 'on-the-job' refinement of the classifier. That is, the selection unit 126 may be configured to process the available information (e.g. plant image datasets, plant information, and/or observation information), as it becomes available, by providing it as input values to the classifier, and use the output of the classifier to select certain plants or image datasets of plants for display and/or manual selection or breeding. Moreover, the training unit 128 may be configured to, as new observation information, selection information, and/or information relating to descendants of a plant becomes available, use that information to further train the classifier 129. For example, model parameters or algorithm parameters of the classifier may be adjusted based on the new information. For example, the training unit 128 may be configured to train the classifier each time a new piece of information becomes available in the storage 12. Alternatively, the training unit 128 may be configured to perform training periodically (that is, at certain time intervals), or whenever a certain amount of new information is available, or based on any other trigger.

It will be understood that the plant selection apparatus 10 has been described hereinabove as an apparatus that trains a classifier used to select plants. However, this is not a limitation. In certain embodiments, the plant selection apparatus 10 comprises a pre-trained classifier 129. The training unit 128 may be omitted in such an embodiment. Optionally, also the tracking unit 127 and the observation information 123 may be omitted. However, even if the plant selection apparatus 10 does train the classifier, the tracking unit 127 may still be provided to collect the observation information 123, as described hereinabove. Another plant selection apparatus 10 may retrieve the observation information 123 and (further) train the classifier using the collected information.

In certain embodiments, the training unit 127 and the observation information and selection information may be stored in a different location. For example, information from multiple plant selection apparatuses 10 may be combined and stored in a remote server (not illustrated), for example. This may help to further improve the training.

FIG. 2 illustrates a virtual reality equipment used to allow an observer to observe a plurality of selected plants and make certain selections, and to control the plant selection apparatus 10. As shown, the equipment comprises a VR head-mountable device 201, a left-hand controller 202, a right-hand controller 203, and an audio headset 210 comprising for example a loudspeaker and a microphone (not illustrated). It is not necessary to have all of these components available. For example, a simplified equipment could contain only the VR head-mountable device 201, optionally together with one or both of the controllers 202 and 203, omitting the audio headset 210. For example, the audio headset 210 may be used to issue voice commands and retrieve automated reports by a voice output of the plant selection apparatus 10. Alternatively, the audio headset may be used to talk with colleagues using an audio communication. The VR head-mountable device 201 may comprise goggles optically coupled with display screens for each eye. The VR head-mountable device 201 and the controllers 202 and 203 may further comprise an accelerometer or another sensor to detect movements of the VR head-mountable device. The image dataset displayed on the display screens coupled to the goggles may be modified in dependence on the detected movements. The controllers 202, 203 may be used to select plants, for example by pointing to the plant using the controller and pushing a button on the controller or uttering a voice command.

Figure 3B:
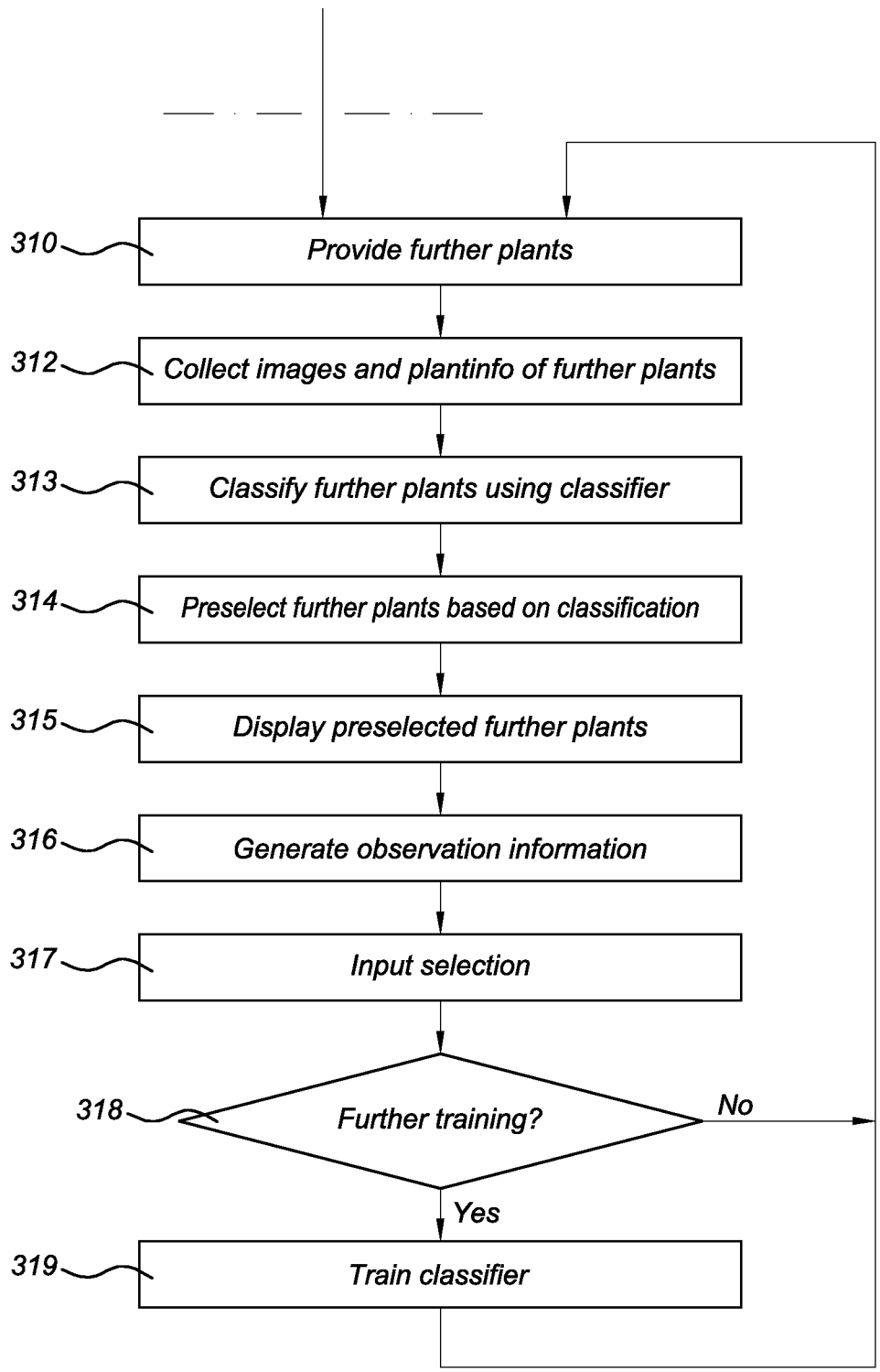
FIG. 3B illustrates a method of aiding plant selection using a trained classifier.

FIG. 3 shows a flowchart of a method for selecting plants. More specifically, FIG. 3A illustrates a method of training a classifier. FIG. 3B illustrates a method of plant selection using a trained classifier, and optionally further improving the classifier.

Referring to FIG. 3A, step 301 involves providing a population comprising a plurality of plants, for example by growing the plurality of plants. This may include steps of putting seeds in pots and providing suitable environmental conditions for growing the plants. In step 302, image datasets of the plants are collected, as well as plant information. For example, the image datasets may be captured by a (partly) robotized operation in which plants are positioned in front of one or more cameras and brought back to their normal place in a greenhouse afterwards. Plant information may be collected by manual user entry or in an automated way, for example including pedigree information or genetic information. For example, a genetic sequencer may generate part of the plant information involving DNA information. A scale may be used to generate a weight information and information about water use. Automated image analysis may be performed on the captured image datasets to generate plant information such as size, color, and more detailed information such as number of branches.

In step 303, a plurality of the plants is preselected. This preselection step may be performed automatically or manually, for example based on certain constraints. These constraints may be pre-set by a user, for example involving limits on size, weight, etc., as desired. It is possible that all available plants are in the preselected plurality of plants.

In step 304, the preselected plants are displayed. A predetermined arrangement of the preselected plants may be presented to an observer, using for example virtual reality equipment. For example, a virtual greenhouse may be generated by arranging the images of the plants in a three-dimensional computer graphics scene. The displayed plants may be displayed by enabling the user to browse through the preselected plants.

In step 305, during the visualization of the plants, observation information is generated and stored, based on tracking the observer. This may involve, for example, comparing the observer's field of view with the displayed plants to detect which plant, or which portion of a plant, or which image dataset of a plant, is observed and for how long. Also it may be recorded of what age the plants are at the time the observed images were captured.

In step 306, an input is received indicative of a user selection of a particular plant. This information is stored in association with the observation information of that plant. In response to the input, the selected plant or plants may be selected for further breeding or cross fertilization. Alternatively a selected plant may be marked for no further breeding by a user. In alternative embodiments, the selected plants may be marked for any other use (such as harvesting) rather than for breeding. Step 306 may comprise selecting at least one plant from said population of plants corresponding to the user selection of said particular plant, for example for further breeding.

In step 307, it is determined whether sufficient information has been collected, i.e. sufficient plant information, plant image datasets, observation information, and selection information. This determination may be based using a predetermined criterion, or based on a user input. Such a criterion may involve a certain minimum number of observations, a certain minimum number of generations of plants for which observations have been generated, or any other suitable criterion.

If not yet sufficient information has been collected, the method returns to step 301 (or, alternatively, to step 303 or 304, for example). If it is decided in step 307 that sufficient information has been collected, the information is used to train a classifier in step 308. This may involve training an artificial neural network based on the collected information. As described above, the observation information may be used as an auxiliary input to the classifier during training. Alternatively, the observation information may be used to augment the plant image datasets to generate suitable inputs for the classifier for training the classifier.

In step 309, it is tested whether the classifier has sufficient quality for being used in production mode. For example, the classifier may be tested using a testing dataset, and the number of errors made by the classifier may be counted. If the number of errors is below a certain percentage of the total number of cases, the quality may be considered to be sufficient. If it turns out that the classifier cannot be trained with sufficient quality based on the available training data, then the method may return to step 301 or 303 or 304 to collect more relevant information for training.

If the quality of the classifier is considered to be sufficient in step 309, the classifier may be considered to be ready for use, i.e. it can enter a 'production mode', starting from step 310, rather than a 'training mode'.

FIG. 3B illustrates a method of using the classifier trained by the method of FIG. 3A. The method begins in step 310 with providing a population comprising a plurality of plants, and optionally growing the plurality of plants. In step 312, image datasets and plant information are generated and collected for the plurality of plants of step 310. Steps 310 and 312 are similar to steps 301 and 302. In step 313, the plants are classified using a trained classifier, in particular the classifier that was output at step 309. This may be done by converting the available information about each plant into appropriate inputs for the classifier, and storing the corresponding output of the classifier.

In step 314, a preselection of the plants is made based on the output of the classifier. For example, the output of the classifier is indicative of an estimate of a suitability of the plant for breeding. For example, the output of the classifier is a numerical value indicative of the suitability of the plant for breeding. In addition to the output of the classifier, the preselection may be made further based on objective criteria, such as used in step 303.

In step 315, the preselected plants are displayed, similar to step 304. The display of the plants may include displaying an indication of the classification generated by the classifier. In principle, only the plants that are in the preselection are displayed. However, there may be a mode for displaying the remaining, non-preselected, plants. Such a mode may be activated or deactivated, for example, in response to a user input.

In step 316, observation information is generated based on the observations performed by an observer. This may be done similar to step 305. It is noted that in case no further training of the classifier based on observation information is envisaged, this step may be omitted.

In step 317, an input indicative of a user selection is received with respect to a certain plant or certain plants, similar to step 306, and the corresponding user selection information is collected. Step 317 may comprise selecting the certain plant or certain plants corresponding to the user selection, for example for further breeding. In certain implementations, the method may end after step 317. In certain implementations, steps 317, 318, and 319 may be omitted. In this case, the method merely displays the preselected further plants to allow evaluation thereof.

In step 318, it is decided whether further training of the classifier is to be done at this point. If not, the method may proceed from step 310 or e.g. 314 or 315. For example, further training may be performed after each new selection, to continuously refine the classifier's capabilities. Alternatively, a number of new data may be collected so that the training of the classifier is performed based on batches of new data. If further training is to be done, the method proceeds to step 319, in which the data collected in steps 312, 316, 317 is used to further improve the performance of the classifier by training the classifier. After that, the method may proceed to step 310 (or e.g. 314 or 315). For example, the classifier may be trained to learn more detailed constraints on plant properties to more accurately predict plant suitability in accordance to the user's previous plant selections. In certain cases, additional training of the classifier may lead to generation of smaller preselected subsets with plants that have a high likelihood of being suitable for further use in e.g. breeding.

Figure 5:
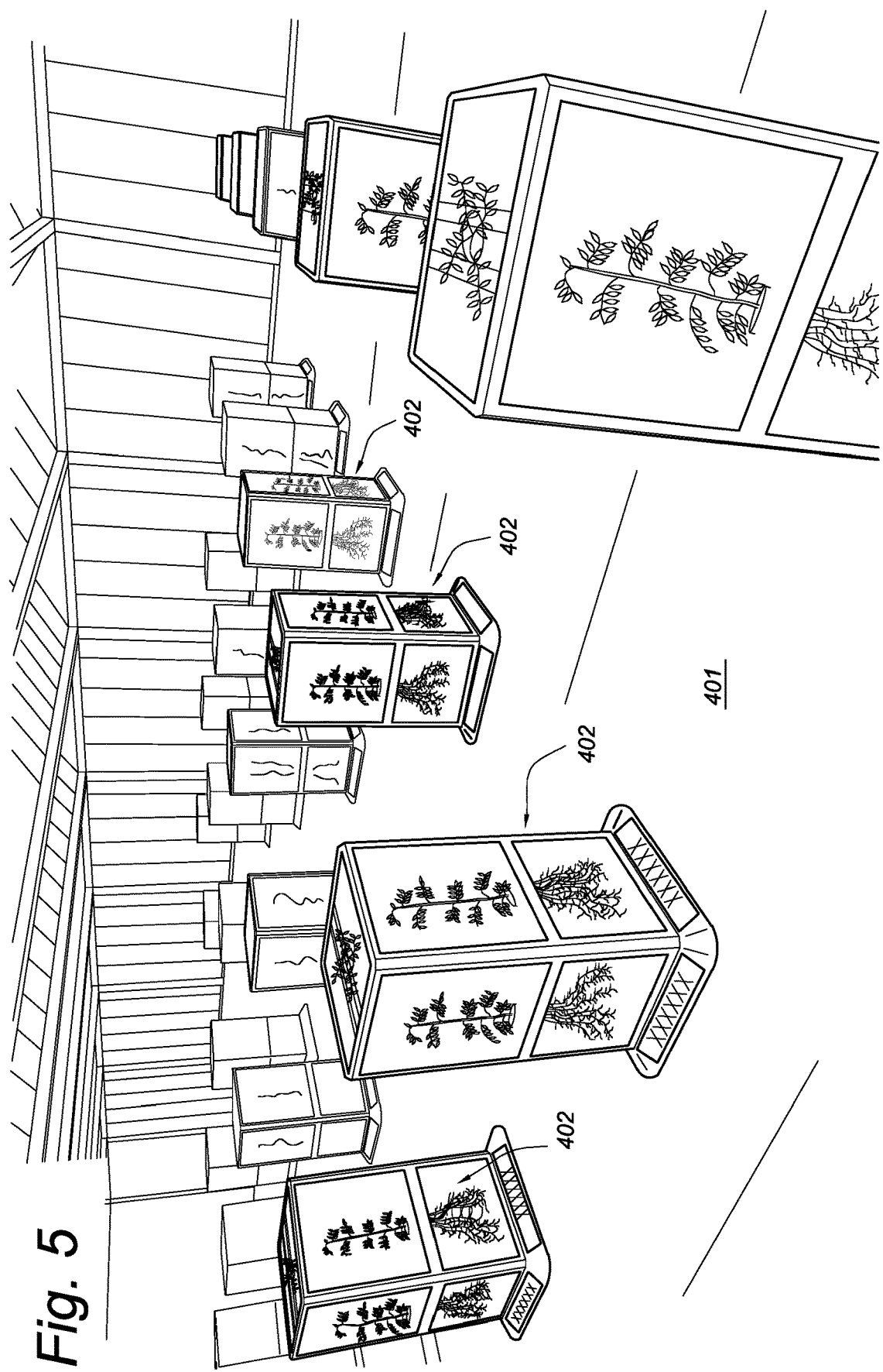
FIG. 5 shows the plurality of computer graphics objects from a different perspective.

FIG. 4 shows an example of a three-dimensional computer graphics scene, in which a plurality of preselected plants are displayed by means of the captured images thereof. The computer graphics scene comprises a large number of computer graphics objects 402, arranged in a rectangular grid 401. FIG. 5 shows a similar picture using a slightly different viewing angle. The user may virtually move around within the computer graphics scene. In that process, different perspective views such as the ones shown in FIG. 4 and FIG. 5 may be generated.

In the example shown in FIG. 4 and FIG. 5, the preselected plants are distributed on a horizontal plane in a grid arrangement in the computer graphics scene. Other arrangements are also possible, for example in a circle in a horizontal plane, a grid arrangement in a vertical plane, or in a three-dimensional grid arrangement. Alternatively, the positions may be determined pseudo-randomly.

In certain implementations, the computer graphics objects are arranged in a predetermined order. For example, the plants may be ordered by height of the plant from short to long. In another example, the plants may be ordered according to an output of the classifier. When the grid is in a plane, positions may be characterized by two parameters (x, y). Position (0, 0) may be for the shortest plant, the next shortest plant may be positioned at position (0, 1), and so forth, until position (0, N), wherein N is the number of plants in a row, and the next shortest plant may be positioned at positon (1, 0), the next shortest plant at position (1, 1), and so forth. In this example, the height of the plant is used ("shortest", "next shortest"). However, other sorting value may be used, such as the output value of the classifier in respect of a plant.

Alternatively, two different characteristics may be sorted on two different axes in the grid. For example, the position on the x-axis may be determined by a height of the plant and the position on the y-axis may be determined by a weight of the plant.

Also, the position on the x-axis may be determined by some characteristic of the plant, and on the different positions on the y-axis, a number of different plants having the same characteristic may be displayed for comparison.

A fourth possible axis is a time axis; a sequence of scenes may be created, rendered, and displayed successively to create a moving three-dimensional world. The time axis of this moving world may correspond, for example, to increasing stages of development of the plants.

In step 304 or 315, a computer graphics rendering of the scene including the preselected plants may be created using, for example, the Direct3D™ or OpenGL™ engine. Alternatively, the rendering may be created by using a suitable ray-casting technique. Such rendering techniques are known to the person skilled in the art. The rendering step may result in a two-dimensional bitmap image, which can be displayed or printed, such as for example the image shown in FIG. 4. Alternatively the rendering step may result in a stereoscopic image, suitable for visualizing through e.g. a head-mountable device as shown in FIG. 2. The rendering involves setting a viewing direction and viewing parameters (such as, perspective or parallel projection, resolution of the computed two-dimensional bitmap image, whether a single bitmap image or a stereoscopic image is created). Such parameters may be set according to need.

Moreover, in step 304 or 315, the computer graphics rendering may be output. The tracking device 15 may track which plant objects are being observed by tracking the viewing direction of an observer, to detect to which plant object an observer is looking.

The preselection of a subset of the plants in step 303 or 314 may be based on an input filter defining certain selection criteria. The criteria applied by the filter may be automatic, using a pre-programmed filter, or based on a user input. In step 314, in addition or alternatively, the output of the classifier of step 313 is used for the selection.

Figure 6:
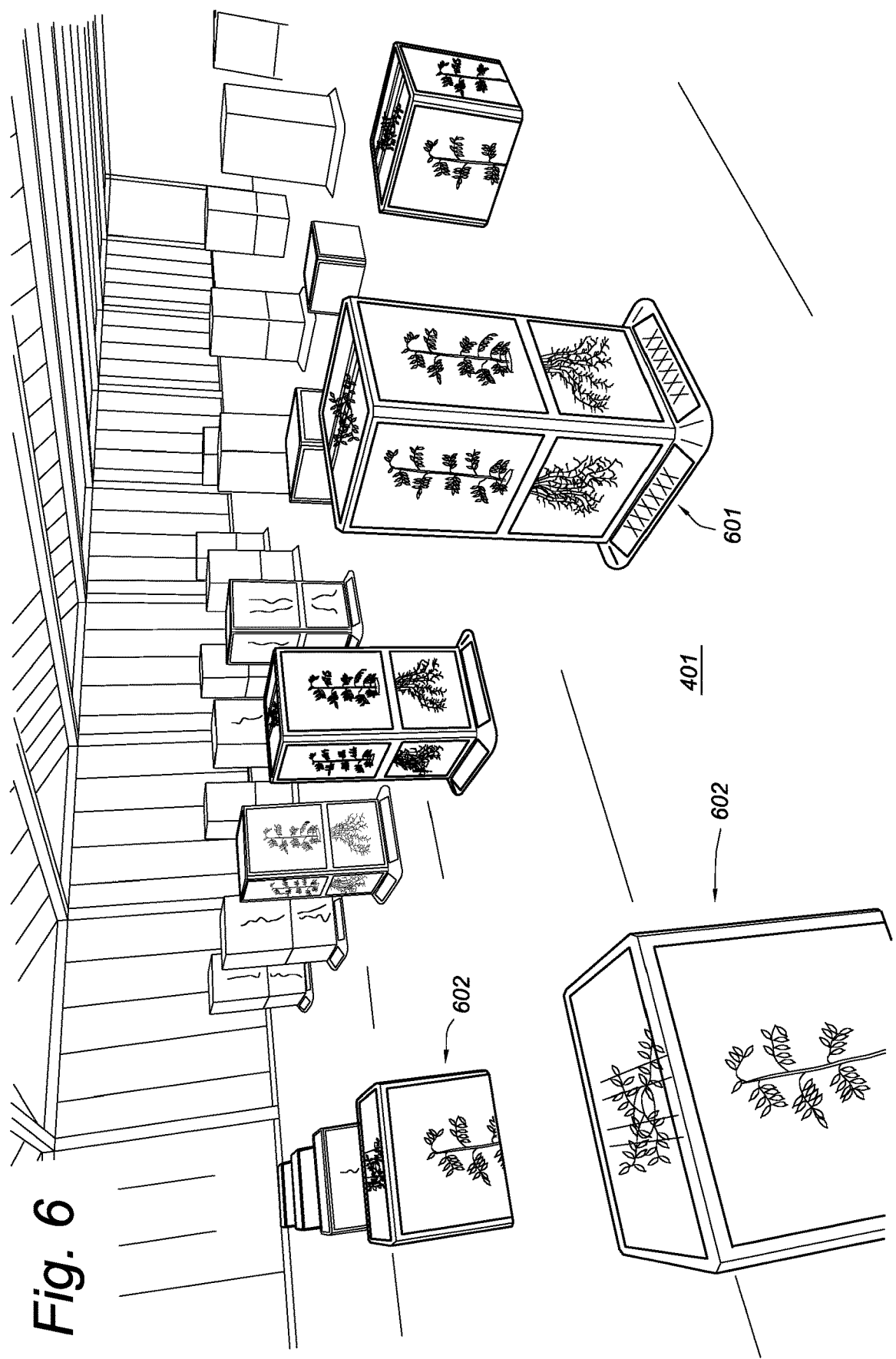
FIG. 6 shows a plurality of computer graphics objects, some of which are partly hidden.

FIG. 6 shows another example. The processor 11 may be configured to position objects 601, 602 in step 304 or 315 with different heights. This way it is possible that some of the objects (e.g. 602) are partially occluded by another, planar, object (e.g. the floor), whereas other objects (e.g. 601) are fully visible. This effect, or another visual effect, may be used to show plants satisfying certain first criteria in a first rendering mode while showing plants satisfying certain second criteria in a second rendering mode, which differs from the first rendering mode. The first and second criteria may involve a criterion on the output of the classifier.

For example, when the computer graphics objects have been set and their textures applied and the positions set, the step of rendering the computer graphics scene and outputting the computer graphics rendering in step 304 or 315 may be repeated. In between the repetitions, the viewing position or viewing angle may be changed. For example, the input device 16 may be configured to receive a user input while the rendering is displayed or the head-mountable device 201 may be configured to transmit a motion or viewing direction to the communication unit 13. The processor 11 may be configured to, in response to this user input, adapt a viewing position or a viewing angle of the observer based on the user input. Next, the scene may be rendered and displayed again, using the new viewing position and viewing angle. This may allow a user to virtually walk through the scene as if it were a real greenhouse.

In another possible extension of the system, the processor 11 may be further configured to control exchanging information about the preselection of the plants with a server or another system for plant selection, using the communication unit 13. Also, the position and/or the sorting options may be exchanged with the server or peer system. Thus, the preselection of the plants and the three-dimensional positions of the computer graphic objects 402 may be synchronized with the server or the other system for plant selection. The observation information and user selection input generated by the other plant selection apparatus may be collected and combined with the observation information and user selection input collected by the plant selection apparatus 10. For example, information from a plurality of plant selection apparatuses may be collected by a server. Training of the classifier may also take place in the server.

In another possible extension of the system, the processor 11 is further configured to control transmitting and receiving information about the viewing position or viewing direction used for creating the computer graphics rendering with the server or the other system for plant selection. This way, it is possible that remotely located users can see each other in the computer graphics scene showing the virtual greenhouse. The processor 11 can control creating a computer graphics object representing another user and assigning a position to the computer graphic object representing the other user in the computer graphics scene based on the received information about the viewing position or viewing direction of the other user. The computer graphics object representing the other user in the computer graphics rendering of the scene.

In another possible extension of the system, breeding information including statistics of the plant characteristic data is displayed within the computer graphics scene. A computer graphics object 601 is created, which may contain, for example, text or graphs or numbers, representing breeding information, wherein the breeding information comprises statistics of the plant characteristic data. The computer graphics object 601 representing the breeding information is given a position in the computer graphics scene. Thus, the object showing the breeding information may be included in the computer graphics rendering.

Some or all aspects of the invention may be suitable for being implemented in form of software, in particular a computer program product. The computer program product may comprise a computer program stored on a non-transitory computer-readable media. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be executable by one or more processors.

The examples and embodiments described herein serve to illustrate rather than limit the invention. The person skilled in the art will be able to design alternative embodiments without departing from the spirit and scope of the present disclosure, as defined by the appended claims and their equivalents. Reference signs placed in parentheses in the claims shall not be interpreted to limit the scope of the claims. Items described as separate entities in the claims or the description may be implemented as a single hardware or software item combining the features of the items described.

The invention claimed is:

1. An apparatus for training a classifier to classify plants, the apparatus comprising
    a storage means for storing a plurality of image datasets representing a plurality of plants, and associated plant information including at least one of genotype information of the plurality of plants, phenotype information of the plurality of plants, and pedigree information of the plurality of plants;
    a preselection unit configured to preselect a subset of one or more plants of the plurality of plants;
    a display device for displaying the preselected subset of plants using the image datasets;
    a tracking unit configured to generate observation information comprising information on which of the preselected subset of plants is observed by a user, wherein the storage means is configured for storing the observation information;
    an input device for receiving an input indicative of a user selection of at least one plant among the preselected subset of plants, wherein the storage means is configured for storing information relating to the user selection of the at least one plant;
    a classifier for classifying plants; and
    a training unit configured to train the classifier to predict the user selection based on the observation information, the information relating to the user selection, and the plant information including said at least one of the genotype information, the phenotype information, and the pedigree information.

2. The apparatus according to claim 1,
wherein the observation information comprises information on at least one of:
which specific portion of an observed plant is observed;
which image dataset representing a plant is observed;
which portion of which image dataset representing a plant is observed; and
the amount of time the plant, portion of the plant, image dataset representing the plant, or portion of the image dataset representing the plant is observed.

3. The apparatus according to claim 2, wherein the specific portion includes at least one of a root, a stem, a leaf, a flower, and a fruit.

4. The apparatus according to claim 1,
further comprising a tracking device configured to generate a signal indicative of a field of view of an observer, wherein the tracking device comprises for example an eye tracker, a movement sensor, or a location sensor, and
wherein the tracking unit is configured to generate the observation information based on the signal from the tracking device.

5. The apparatus according to claim 4,
further comprising a virtual reality (VR) or augmented reality (AR) system configured to show the image datasets of the preselected plurality of plants in a three-dimensional scene, wherein the VR or AR system comprises the display device and the tracking device.

6. The apparatus according to claim 1, wherein the preselection unit is configured to preselect the plurality of plants further in dependence on a classification of the plants generated by the classifier.

7. An apparatus for use in plant selection, comprising
a storage means for storing a plurality of image datasets representing a plurality of first plants, and associated plant information including at least one of genotype information of the plurality of first plants, phenotype information of the plurality of first plants, and pedigree information of the plurality of first plants;
a classifier for classifying the first plants based on the associated plant information, wherein the classifier is trained based on a dataset relating to a plurality of second plants different from the plurality of first plants, the dataset comprising observation information relating to which of the second plants is observed by a user, user selection information relating to a user selection of at least one plant among the second plants input by the user, and plant information including at least one of genotype information of the second plants in the dataset, phenotype information of the second plants in the dataset, and pedigree information of the second plants in the dataset;
a preselection unit configured to preselect a subset of one or more plants of the plurality of first plants based on a classification of the first plants generated by the classifier;
a display device for displaying the preselected subset of first plants using the image datasets.

8. The apparatus according to claim 7, further comprising:
a tracking unit configured to generate observation information comprising information on which of the preselected subset of plants is observed by a user, wherein the storage means is configured for storing the observation information;
an input device for receiving an input indicative of a user selection of at least one plant among the preselected subset of first plants, wherein the storage means is configured for storing information relating to the user selection of the at least one plant.

9. The apparatus according to claim 7, further comprising
an input device for receiving an input indicative of a user selection of at least one plant among the preselected subset of first plants; and
a plant conveyor system for identifying the actual at least one plant corresponding to the user selection and isolating the at least one plant from multiple stored plants by transporting the at least one plant to a designated location.

10. The apparatus according to claim 7, further comprising an automated plant imaging apparatus for automatically positioning a plant with respect to an image sensor, for example in front of a camera, and capturing an image dataset of the plant using the image sensor, and then automatically moving the plant to its designated position and automatically positioning a next plant with respect to the image sensor for capturing an image dataset of the next plant using the image sensor, wherein the storage means is configured to store the captured image datasets in association with each corresponding plant.

11. The apparatus according to claim 7, comprising a phenotype detection unit configured to generate the phenotype information by performing image analysis of at least one image dataset of a plant to detect a phenotype characteristic of the plant based on the image dataset.

12. A method of training a classifier to classify plants, the method comprising
collecting and storing a plurality of image datasets representing a plurality of plants, and associated plant information including at least one of genotype information of the plurality of plants, phenotype information of the plurality of plants, and pedigree information of the plurality of plants;
preselecting a subset of one or more plants of the plurality of plants to obtain a preselected subset of plants;
displaying the preselected subset of plants using the image datasets;
generating observation information comprising information on which of the preselected subset of plants is observed by a user, and storing the observation information;
receiving an input indicative of a user selection of at least one plant among the preselected subset of plants, and storing information relating to the user selection of the at least one plant; and
training a classifier for classifying plants, wherein the training is based on the observation information, the information relating to the user selection, and the plant information including said at least one of the genotype information, the phenotype information, and the pedigree information.

13. The method of claim 12, further comprising providing the plants, and wherein the collecting the plurality of image datasets comprises capturing at least one image dataset of each plant using an image sensor.

14. The method of claim 12, further comprising
collecting and storing a further plurality of image datasets representing a plurality of further plants, and associated further plant information including at least one of genotype information of the plurality of further plants, phenotype information of the plurality of further plants, and pedigree information of the plurality of further plants;

classifying the plurality of further plants based on the associated further plant information, using the trained classifier, to generate a classification of the further plants;

preselecting a subset of one or more further plants of the plurality of further plants based on the classification of the further plants generated by the classifier, to obtain a preselected subset of further plants; and displaying the preselected subset of further plants using the image datasets representing the further plants.

15. A computer program product comprising instructions that, when executed by a processor system, cause the processor system to perform the method of claim 12.

16. A method of preselecting plants, comprising
collecting and storing a plurality of image datasets representing a plurality of first plants, and associated plant information including at least one of genotype information of the plurality of first plants, phenotype information of the plurality of first plants, and pedigree information of the plurality of first plants;

classifying the plurality of first plants based on the associated plant information, using a classifier that is trained based on a dataset relating to a plurality of second plants different from the plurality of first plants, the dataset comprising observation information relating to observation of the plurality of second plants by a user, user selection information relating to a user selection among the plurality of second plants input by the user, and plant information including at least one of genotype information of the plurality of second plants, phenotype information of the plurality of second plants, and pedigree information of the plurality of second plants;

preselecting a subset of one or more first plants of the plurality of first plants based on a classification of the first plants generated by the classifier; and displaying the preselected subset of first plants using the image datasets.

17. The method of claim 16, further comprising providing the first plants, and wherein the collecting the plurality of image datasets comprises capturing at least one image dataset of each first plant using an image sensor, and selecting, by a user, at least one plant among the displayed preselected subset of plants.

18. The method of claim 16, further comprising
generating observation information comprising information on which of the preselected subset of first plants is observed by a user, and storing the observation information; and receiving an input indicative of a user selection of at least one first plant among the preselected subset of first plants, and storing information relating to the user selection of the at least one first plant.

19. A computer program product comprising instructions that, when executed by a processor system, cause the processor system to perform the method of claim 16.

* * * * *